United States Patent
Rosenberg et al.

(10) Patent No.: US 7,469,920 B2
(45) Date of Patent: Dec. 30, 2008

(54) KINGPIN LOCK

(75) Inventors: Avron Rosenberg, Golden Valley, MN (US); Kirk Busse, Sauk Rapids, MN (US); Jon Hample, Minneapolis, MN (US)

(73) Assignee: Cargo Protectors, Inc., Sauk Rapids, MN (US)

( * ) Notice: Subject to any disclaimer, the term of this patent is extended or adjusted under 35 U.S.C. 154(b) by 292 days.

(21) Appl. No.: 11/440,480

(22) Filed: May 25, 2006

(65) Prior Publication Data

US 2006/0290101 A1   Dec. 28, 2006

Related U.S. Application Data

(60) Provisional application No. 60/684,278, filed on May 25, 2005.

(51) Int. Cl.
*B60D 1/60* (2006.01)

(52) U.S. Cl. .................. 280/507; 280/432; 70/232

(58) Field of Classification Search .......... 280/507, 280/514, 432; 70/14, 232
See application file for complete search history.

(56) References Cited

U.S. PATENT DOCUMENTS

| | | | |
|---|---|---|---|
| 2,554,306 A | 5/1951 | Mack | |
| 2,755,655 A | 7/1956 | Maffey | |
| 3,415,085 A | 12/1968 | Eble, Jr. | |
| 3,600,914 A | 8/1971 | Johnson et al. | |
| 3,798,938 A | 3/1974 | McCullum | |
| 3,922,897 A | 12/1975 | Mickelson | |
| 4,031,727 A | 6/1977 | DeGroat et al. | |
| 4,132,093 A | 1/1979 | McDorman, Sr. | |
| 4,305,266 A | 12/1981 | Lockwood | |
| 4,620,718 A * | 11/1986 | Mickelson | 280/507 |
| 4,697,444 A | 10/1987 | Maffey | |
| 4,704,883 A | 11/1987 | Dykes | |
| 5,259,223 A | 11/1993 | Nee | |
| 5,297,407 A * | 3/1994 | Tarr | 70/232 |
| 5,491,992 A * | 2/1996 | Mandall | 70/232 |
| 6,761,050 B2 * | 7/2004 | Rosenberg | 70/14 |
| 6,848,282 B2 | 2/2005 | Palzkill et al. | |
| 2004/0083776 A1 * | 5/2004 | Rosenberg | 70/14 |

* cited by examiner

*Primary Examiner*—Paul N Dickson
*Assistant Examiner*—Tashiana Adams
(74) *Attorney, Agent, or Firm*—Patterson, Thuente, Skaar & Christensen, P.A.

(57) ABSTRACT

A kingpin lock including a body having a substantially frustoconical portion and a kingpin cavity having a central axis, a slide channel having a central axis and a sleeve channel having a central axis. The slide channel intersects the kingpin cavity such that its central axis is substantially offset from a radius that extends outwardly from the central axis of the kingpin cavity. The sleeve channel intersects the slide channel. A slide member is shiftable between an engaged position extending partially into the kingpin cavity and a disengaged position where the slide member does not engage the kingpin. A locking member is shiftable between an engaged position and a disengaged position such that the locking member engages an indentation in the slide member so that the slide member is secured in the engaged position and the kingpin lock is secured to the kingpin.

18 Claims, 9 Drawing Sheets

KINGPIN LOCK

CLAIM TO PRIORITY

This application claims priority to U.S. Provisional Patent Application 60/684,278 filed May 25, 2005 and entitled "Kingpin Lock," the entire contents of which are incorporated by reference.

FIELD OF THE INVENTION

The invention generally relates to locking devices for locking attachments to some conventional structure provided with means for detachably receiving such devices. More particularly the invention relates to locks that are applied to cover the kingpin on a semi-trailer to prevent the trailer from being hauled away by an unauthorized semi-tractor.

BACKGROUND OF THE INVENTION

Kingpin locks exist in the prior art. Kingpin locks cover the kingpin of a semi-trailer to prevent connection of the semi-trailer to a semi-tractor. One common method of stealing the contents of a semi-trailer is to approach a trailer that has been disconnected from its tractor and parked and to use an additional, unauthorized, tractor to connect to the kingpin of the semi-trailer to then drive away with the semi-trailer in its entirety. Kingpin locks which exist in the prior art are generally utilized to cover the kingpin with a lock which has a receiving aperture or wraparound device which permits lockable engagement to a trailer kingpin to prevent a thief from attaching the trailer to a secondary tractor vehicle.

Generally, a kingpin lock has a bulky enough structure that it makes it impossible to engage the kingpin enclosed in the kingpin lock with the fifth wheel of the tractor.

Unfortunately, enterprising thieves have discovered that many kingpin locks can be defeated by modification of existing fifth wheel devices. A fifth wheel generally includes a large, substantially flat plate with a funnel shape entrance at the rear which receives the kingpin and directs it to a slot where a crossbar secures the kingpin in the slot. Current kingpin locks are often substantially cylindrical devices large enough to prevent the kingpin from entering the slotted portion of the fifth wheel. Enterprising thieves have modified the fifth wheel by drilling a hole horizontally through the fifth wheel so that a bar can be used to close off the funnel-shaped entry to the fifth wheel. This allows the thief to engage the prior art kingpin lock in the funnel-shaped portion of the fifth wheel and then secure it there, by placing a bar through the drilled holes and across the opening of the funnel-shaped area. This secures the kingpin lock in a way similar to the way that a kingpin would be secured and allows the thief to pull the trailer with the tractor to drive it, along with its contents, away.

Another approach to stealing a trailer that has been locked with a kingpin lock is to remove or destroy the lock. A thief is not generally interested in consuming valuable time analyzing a complex locking system. Instead, thieves are likely to employ force in an attempt to break the locks. Since many conventional and often-complex locks include components undesirably exposed outside the kingpin lock housing, vulnerability is relatively high. Existing kingpin locks that include thin housings and light weight structures can be subjected to substantial force with tools such as sledgehammers, pry bars and large pipe wrenches to initiate breakage. In addition, the kingpin structure is very robust so that blows directed radially toward the center of the kingpin tend to be effective in breaking kingpin lock structures before breaking the kingpin.

Thus, the trucking industry would benefit from a kingpin lock that would more effectively deter efforts to defeat existing kingpin locks.

SUMMARY OF THE INVENTION

The kingpin lock of the present invention solves the above-discussed problem by providing a kingpin lock, which is much harder to defeat by using a modified fifth wheel to haul away a locked semi-trailer. In addition, the kingpin lock has features that make it less likely to be broken by brute force attacks. The kingpin lock of the present invention generally includes a lock housing, a selectively engageable lock and a sliding member. The lock housing is at least partially frustoconical in shape and significantly larger in size than many conventional, prior art kingpin locks. The lock housing is formed of a solid piece of malleable material to minimize the risk that thieves will be able to break the housing by force. In addition, the orientation of internal locking components helps to protect the locking components from attempts to break them by force. Because of the invention's generally frustoconical shape, if a thief attempts to engage a tractor to a trailer secured with the kingpin lock of the present invention, the kingpin lock will ride up over the fifth wheel and the funnel shaped entry area and cannot be engaged to be pulled by the tractor because of its size and conical structure. If a modified fifth wheel is used, as discussed above, the kingpin lock of the invention tends to ride up over the bar used to close the funnel shaped portion of the fifth wheel. Thus, the above theft technique is defeated.

The lock housing also has a wedge-shaped portion that encloses the sliding member and the selectively engageable lock. The selectively-engageable lock sleeve is located so that it is substantially on a tangent of a circle centered on the kingpin, thus force applied to the selectively engageable lock such as by a hammer tends to be dissipated by rotation of the kingpin lock. The sliding member is located substantially displaced from a radial line from the center of the kingpin so that application of force to the sliding member will also tend to rotate the kingpin lock rather than damage the sliding member.

The selectively-engageable lock is also positioned in a recess formed by an intersection of the frustoconical portion of the lock and the rectangular wedge shaped portion to protect it from hammer blows and the like.

DETAILED DESCRIPTION OF THE INVENTION

Referring to FIGS. 1-6, 13 and 14, kingpin lock 10 generally includes a body 12, slide 14, lock sleeve 16 and latch 18.

Figure 13:
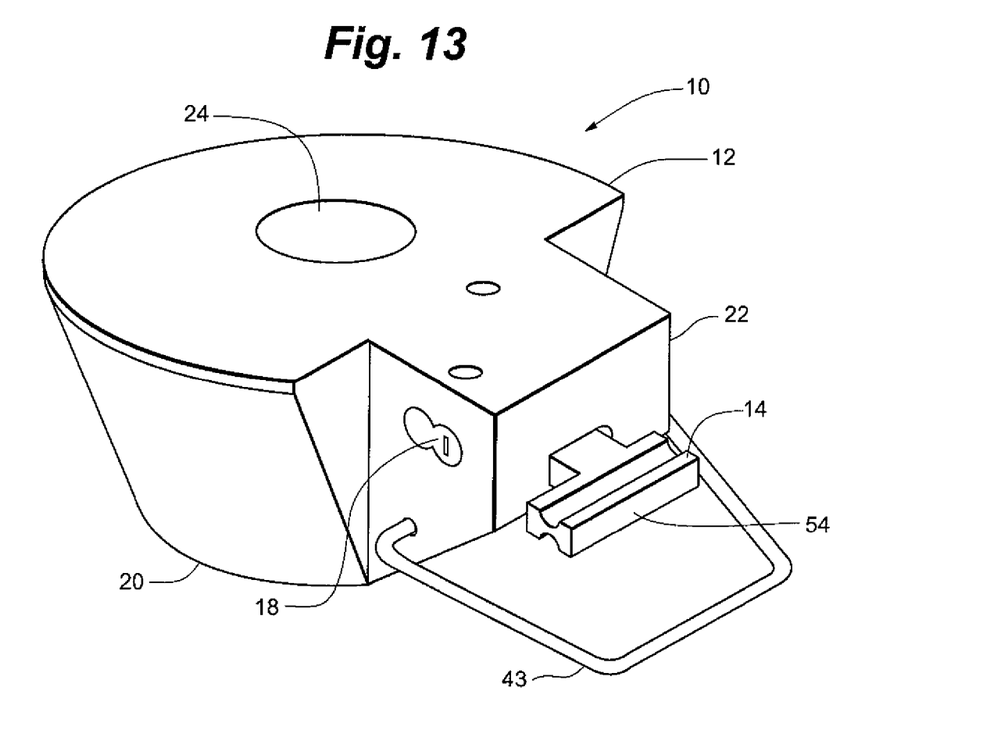
FIG. 13 is a perspective view of a kingpin lock in accordance with the present invention.

Referring particularly to FIG. 13, body 12 includes substantially frustoconical portion 20 and locking portion 22. Body 12 also defines kingpin cavity 24, slide channel 26 and sleeve channel 28. Body 12 is formed so that the size of the base of frustoconical portion 28 relates to the size of kingpin cavity 24 at a ratio of approximately 8:3. Base portion of frustoconical portion 28 may range from about two times the diameter of kingpin cavity 24 to about four times the diameter of kingpin cavity 24.

Figure 8:
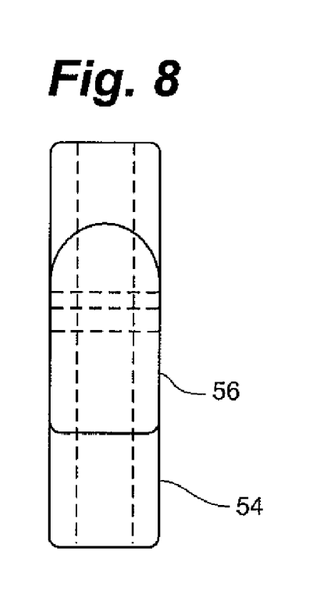
FIG. 8 is a front elevational view of the sliding member with certain structures depicted in phantom.

Slide channel 26 passes through locking portion 22. It is notable that slide channel 26 is positioned such that its central axis 30 is displaced from a radius 32 that extends outwardly substantially from center 34 of kingpin cavity 24. Slide channel 26 is positioned to align with a circumferential groove (not shown) on a kingpin 35 which is generally standardized for tractor trailers throughout the industry. Slide channel 26 may be, for example, shaped arcuately on one edge and flat on an opposing edge, as depicted in FIG. 8. Slide channel 26 passes completely through locking portion 22 and is in communication with kingpin cavity 24.

Sleeve channel 28 passes through locking portion 22 of body 12 and intersects with slide channel 26. In one embodiment of the invention, sleeve channel 28 intersects slide channel 26 substantially at a right angle. It is notable that the central axis 36 of sleeve channel 28 is substantially tangent to a circle substantially centered upon center 34 of kingpin cavity 24. Sleeve channel 28 may be oval or circular shaped to receive lock sleeve 16.

Figure 3:
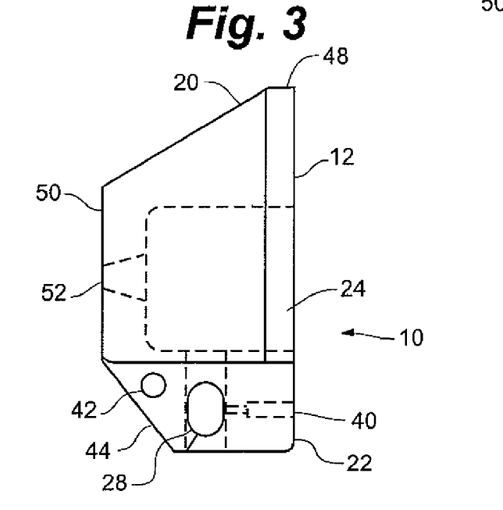
FIG. 3 is a side elevational view the body of the kingpin lock in accordance with the present invention with certain structures depicted in phantom.
Figure 4:
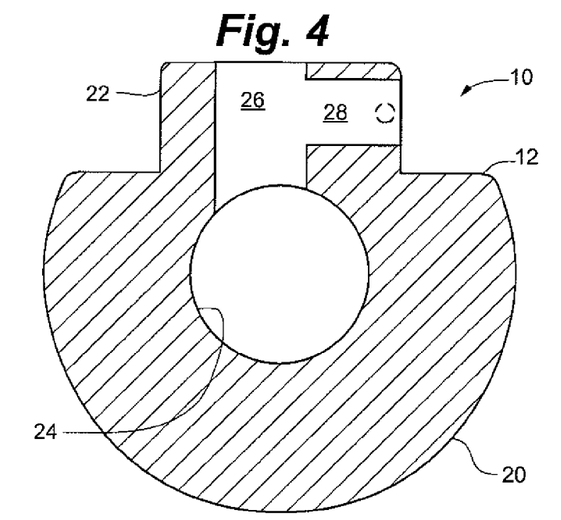
FIG. 4 is a sectional view of a kingpin lock taken along section line 4-4 of FIG. 2.
Figure 5:
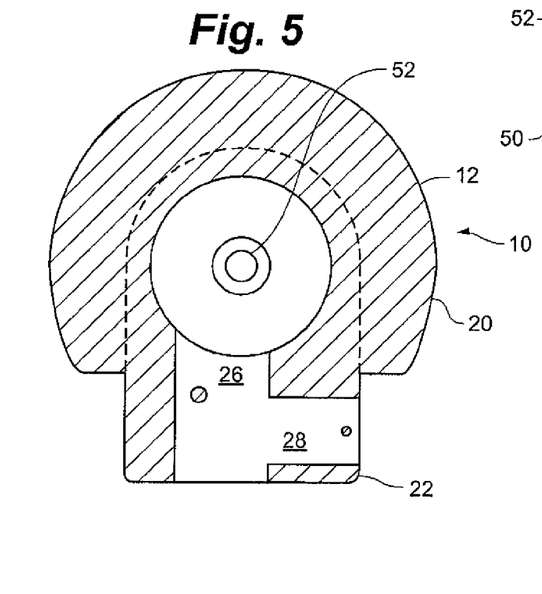
FIG. 5 is a sectional view taken along section line 5-5 of FIG. 2.
Figure 6:
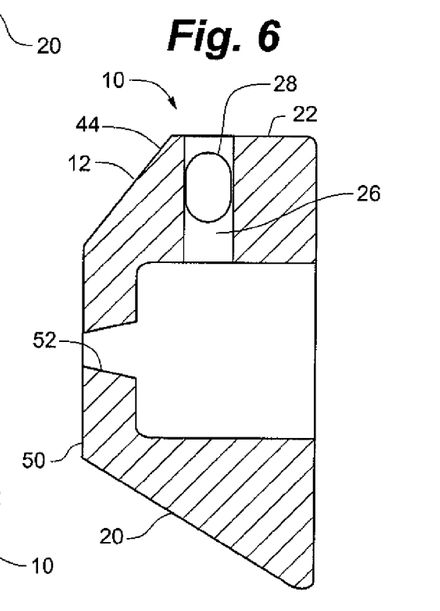
FIG. 6 is a sectional view taken along section line 6-6 of FIG. 1.

Slide channel 26 may intersect with slide pin channel 38. Sleeve channel 28 intersects with sleeve pin channel 40. Sleeve pin channel 40 may be stepped as depicted in FIG. 3 to accommodate a stepped pin (not shown.)

Locking portion 22 may also define handle receiving apertures 42. The handle receiving apertures 42 are configured to receive carrying handle 43.

Locking portion 22 may be substantially rectilinearly shaped and may include angled bottom 44. In the depicted embodiment of the invention, locking portion 22 meets frustoconical portion 20 substantially at a right angle creating two angled recesses 46.

Frustoconical portion 20 defines kingpin cavity 24 as discussed above. Additionally, frustoconical portion 20 may define cylindrical rim 48 and flat bottom 50. Frustoconical portion 20 may also define drainage bore 52 connecting kingpin cavity 24 through flat bottom 50. Drainage bore 52 may take the shape of a truncated cone or may be substantially cylindrical or another shape.

Figure 7:
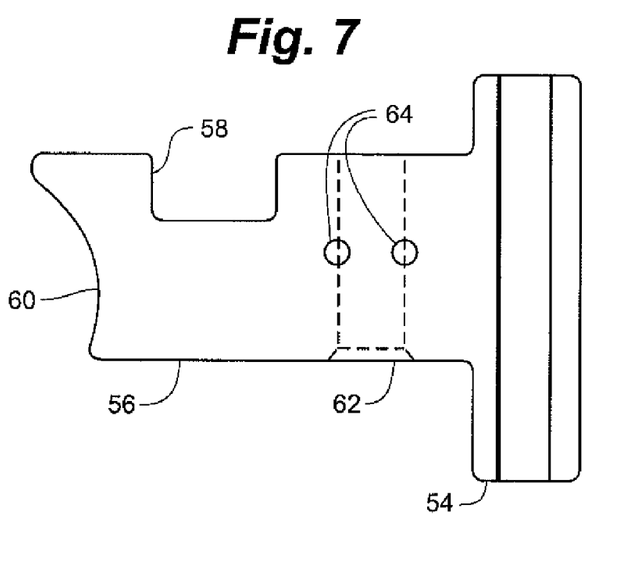
FIG. 7 is a plan view of a slide member in accordance with the present invention.
Figure 9:
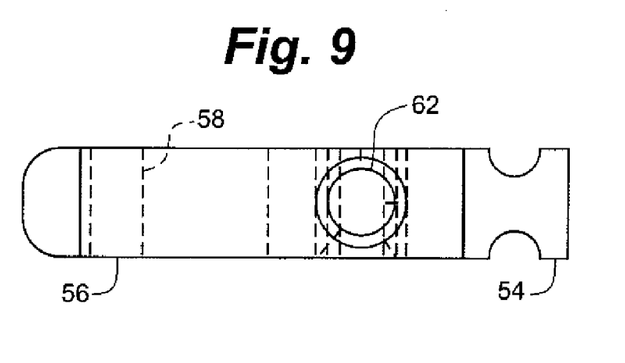
FIG. 9 in a side elevational view of the sliding member with certain structures depicted in phantom.

Referring to FIGS. 7-9, slide 14 is dimensioned to fit into slide channel 26. Slide 14 is substantially T-shaped having handle 54 and bolt portion 56. Handle 54 is sized for easy grasping and is too large to pass into slide channel 26. Bolt portion 56 defines notch 58, concave portion 60 and latch receiver 62. Latch receiver 62 may be a substantially cylindrical passage drilled or otherwise formed into or through bolt portion 56. Bolt portion 56 also, optionally, can include hardened pins 64 which are inserted so as to partially intersect latch receiver 62. Slide 14 can be held into slide channel 26 by a pin or other means known in the art so that it does not fall out.

Figure 10:
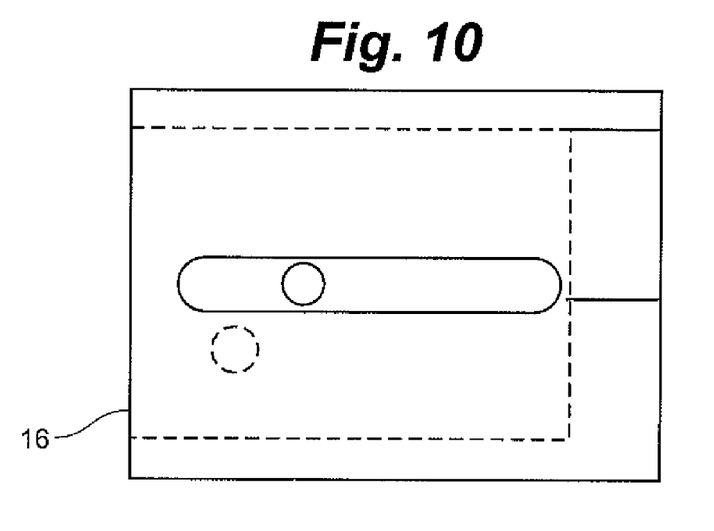
FIG. 10 is a plan view of a lock sleeve in accordance with the present invention.
Figure 11:
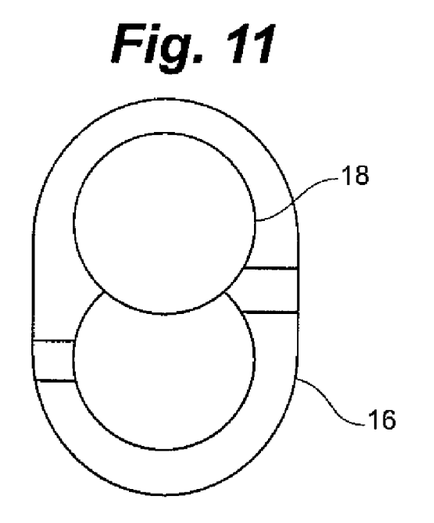
FIG. 11 is an elevational view of the lock sleeve.
Figure 14:
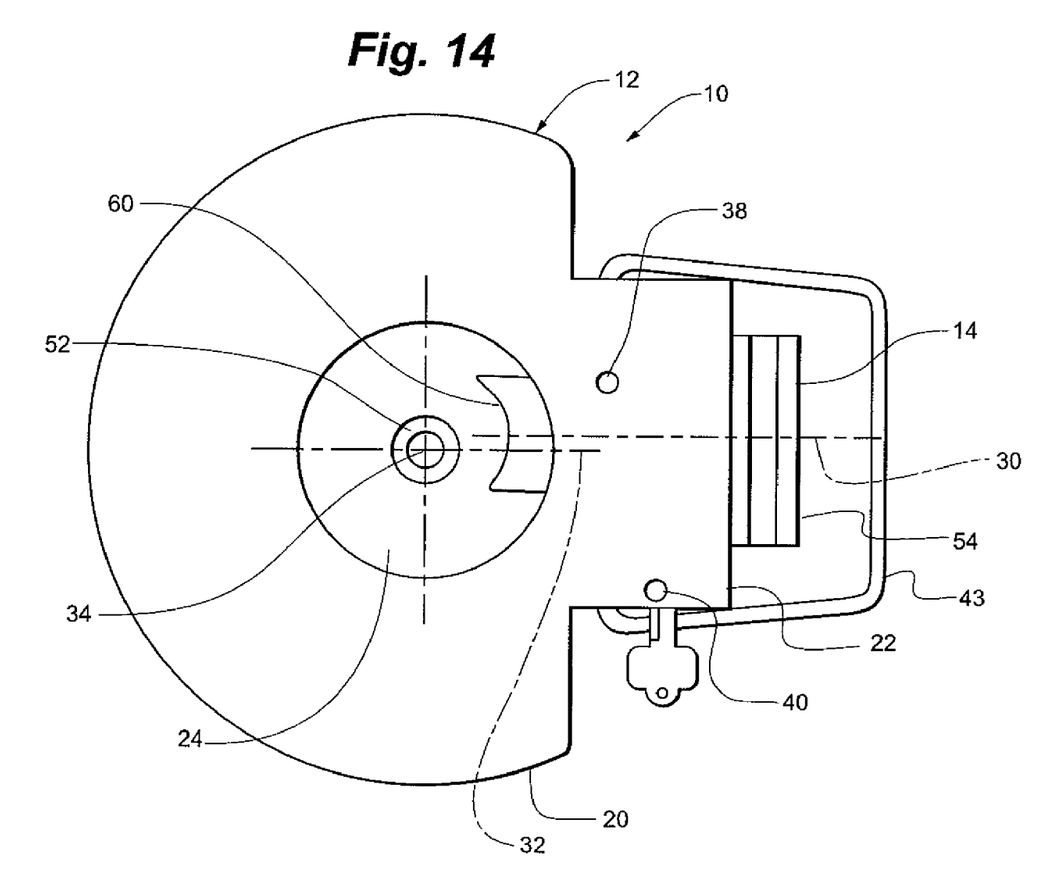
FIG. 14 is a plan view of an embodiment of a kingpin lock in accordance with the present invention.

Referring particularly to FIGS. 10, 11 and 14, lock sleeve 16 is a substantially oval, race-track shaped or round cylindrical structure that is machined internally to receive latch 18. Latch 18 may be a key latch mechanism that is adapted to fit into latch receiver 62. In one embodiment, latch 18 is also adapted to fit between hardened pins 64 in the unlocked position and to rotate so that it is engaged with hardened pins 64 when in a locked position and is not removable from latch receiver 62 when locked. Latch 18 may be releasably secured by other techniques known in the art.

Body 12 may be formed from ductile cast iron, aluminum alloy or another high strength material. Malleable metals are appropriate materials. Slide 14 may be formed from ductile cast iron or another high strength, breakage resistant material. Lock sleeve 16 is desirably formed of stainless steel or another high strength material that is resistant to drilling.

Figure 1:
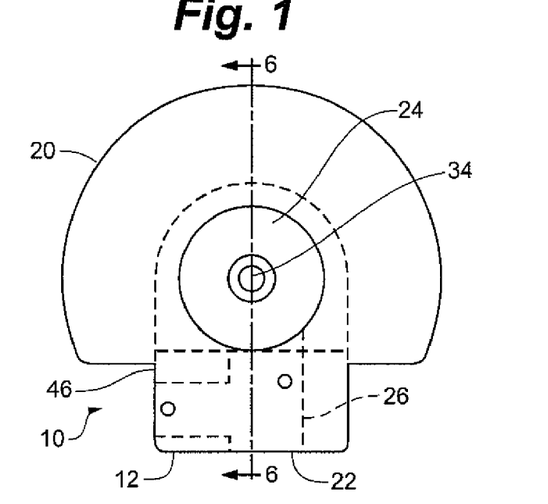
FIG. 1 is a plan view of an embodiment of a body of a kingpin lock in accordance with the present invention with certain structures depicted in phantom.
Figure 2:
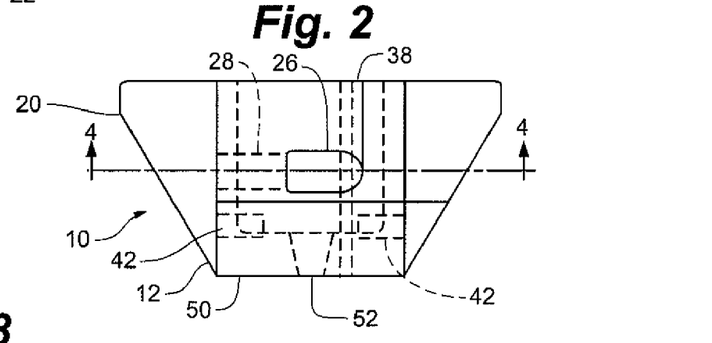
FIG. 2 is a front elevational view of the body of the kingpin lock in accordance with the present invention with certain structures depicted in phantom.

As can be seen in FIGS. 2 and 3, frustoconical portion 20 desirably defines an angle of about twenty degrees to forty degrees. In one aspect of the invention the angle is about thirty degrees. Locking portion 22 may have an angle of about thirty degrees to fifty-five degrees. In one embodiment the angle is about forty-five degrees. These angles are exemplary only and should not be considered limiting.

Figure 12:
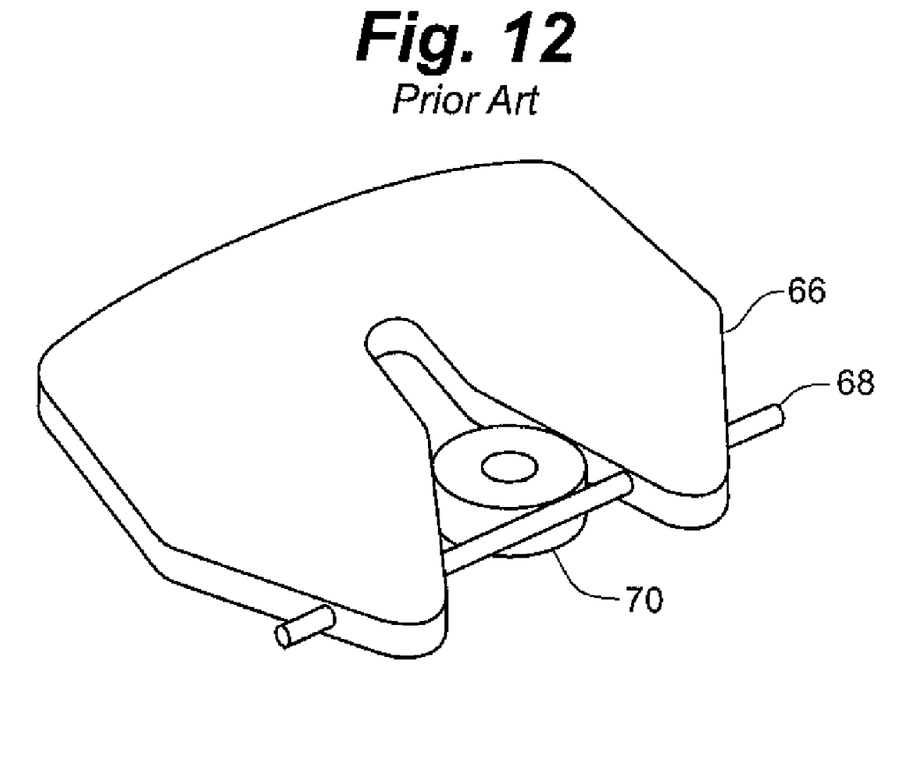
FIG. 12 is a perspective view of a prior art fifth wheel and kingpin lock.

FIG. 12 depicts a modified fifth wheel 66 and a bar 68 and how they are used to defeat a prior art kingpin lock 70.

Figure 15:
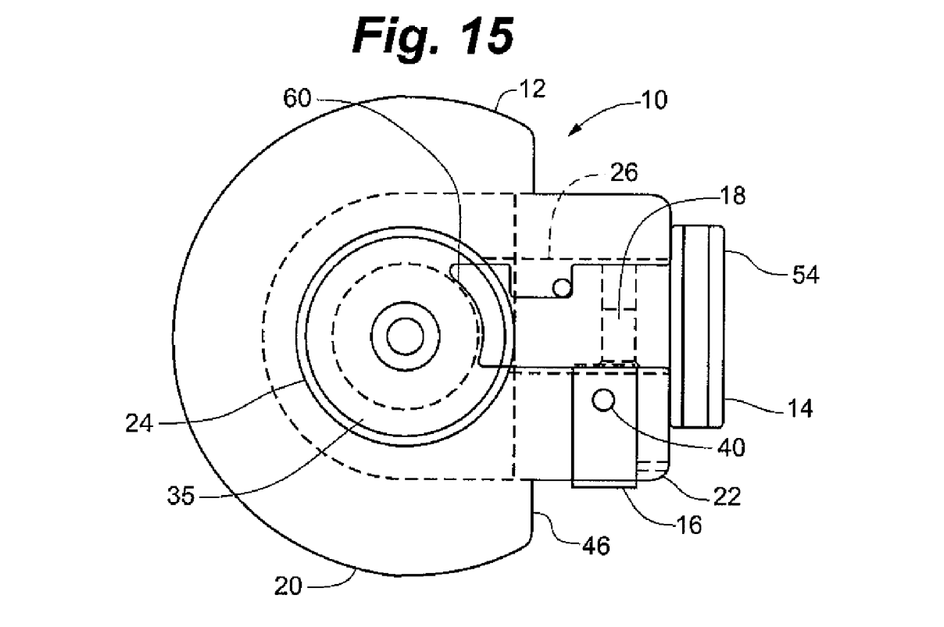
FIG. 15 is a bottom plan view of an embodiment of a kingpin lock in accordance with the present invention secured to a kingpin. Certain structures are depicted in phantom.
Figure 16:
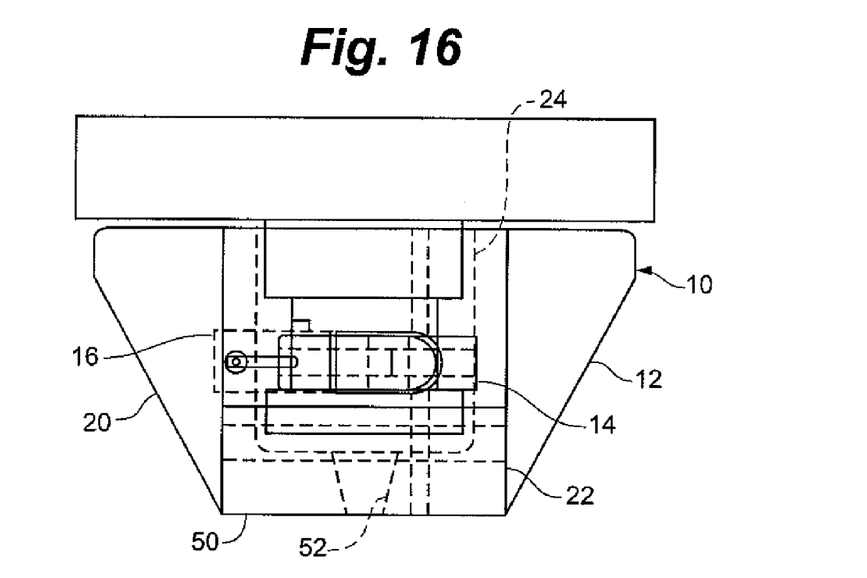
FIG. 16 is a front elevational view of the kingpin lock in accordance with the present invention secured to a kingpin. Certain structures are depicted in phantom.
Figure 17:
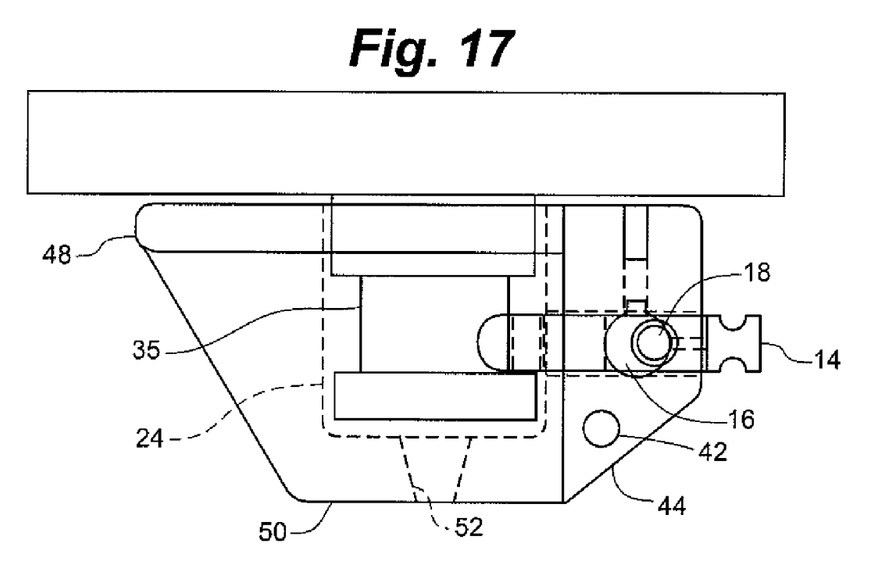
FIG. 17 is a side elevational view of the kingpin lock in accordance with the present invention secured to a kingpin. Certain structures are depicted in phantom.

Referring to FIGS. 15-17, an embodiment of kingpin lock 10 is depicted secured to a kingpin 35. Structures depicted in FIGS. 15-17 are numbers as indicated above. Kingpin lock 10 may also include lightening pockets or holes (not shown) to reduce its weight.

In operation, kingpin lock 10 is placed over a kingpin on a semi-trailer so that the kingpin is received in kingpin cavity 24. Slide 14 is then advanced through slide channel 26 until it is in contact with the kingpin and engaged into a circumferential groove on the kingpin. Slide 14 is then secured in place by latch 18. The kingpin lock 10 is now secured around the kingpin.

The shape of the kingpin lock 10, along with its size, is such that if a tractor having fifth wheel 66 is backed up to the semi-trailer, kingpin lock 10 will ride up over the funnel shaped portion of fifth wheel 66 and cannot be maintained inside the funnel shaped portion of fifth wheel 66. Even if kingpin lock 10 is received within the funnel shaped portion of fifth wheel 66 and an attempt is made to secure it in place with bar 68 upon the tractor attempting to pull the trailer, kingpin lock 10 tends to ride up over bar 68 because of the shape of frustoconical portion 20 and angled bottom 44 and pull out of fifth wheel 66. Thus thieves are deterred from using an unauthorized tractor to pull a trailer that is secured by kingpin lock 10.

In addition, the shape of frustoconical portion 20 and angled bottom 44 tends to deflect hammer blows and other applications of force to kingpin lock 10.

When kingpin lock 10 is applied to a kingpin, it is notable that the orientation of sleeve channel 28, and therefore the orientation of lock sleeve 16, is such that central axis 36 of sleeve channel 28 is located substantially on a tangent to a circle substantially centered on kingpin cavity 24. This orientation protects lock sleeve 16 from attacks by thieves. For example, lock sleeve 16 is protected within angled recess 46 such that it is difficult to attack lock sleeve 16 with hammer blows such as from a sledgehammer. Angled recess 46 makes it difficult to apply force directly to lock sleeve 16 with a hammer because hammer blows are likely to strike frustoconical portion 20 of kingpin lock 10 and be deflected. In addition, hammer blows that may strike locking portion 22 will tend to be dissipated by the rotational movement of kingpin lock 10 about kingpin cavity 24. In addition, the use of a drill against lock sleeve 16 is difficult because of the tendency of kingpin lock 10 to rotate about the kingpin if force is applied to a drill bit in contact with lock sleeve 16.

Handle 54 of slide 14 protrudes from slide channel 26 when slide 14 is in a secured position. Because handle 54 abuts locking portion 22, handle 54 resists attempts to force slide 14 into slide channel 26 to defeat kingpin lock 10. Thus, slide 14 is resistant to attacks such as by sledgehammers as well as to other brute force attempts to damage kingpin lock 10.

In addition, slide channel 26 is located substantially offset from a radius that extends outwardly from the center of kingpin cavity 24. Thus, force applied to handle 54 of slide 14 such as by a sledgehammer tends to be deflected and to cause kingpin lock 10 to rotate rather than to break slide 14 thus resisting attempts to break kingpin lock 10.

The present invention may be embodied in other specific forms without departing from the spirit of the essential attributes thereof, therefore the illustrated embodiments should be considered in all respect as illustrative and not restrictive, reference being made to the appended claims rather than to the foregoing description to indicate the scope of the invention.

The invention claimed is:

1. A kingpin lock comprising:
  a body including a frustoconical portion, the body defining a kingpin cavity having a first central axis, a slide channel having a second central axis and a sleeve channel having a third central axis;
  the slide channel intersecting the kingpin cavity such that the second central axis is substantially offset from a radius that extends outwardly from the first central axis of the kingpin cavity;
  the third central axis of the sleeve channel intersecting the slide channel and the sleeve channel being in communication with the slide channel;
  a slide member that is slidably receivable into the slide channel such that a portion of the slide member is shiftable between an engaged position extending partially into the kingpin cavity to engage a kingpin received in the kingpin cavity and a disengaged position wherein the slide member does not engage the kingpin, the slide member defining an indentation along a side thereof; and
  a locking member that is slidably receivable into the sleeve channel and shiftable between an engaged position and a disengaged position such that in the engaged position a portion thereof extends into the slide channel such that the locking member portion engages the indentation when the indentation is substantially aligned with the sleeve channel, whereby the slide member is secured in the engaged position and the kingpin lock is secured to the kingpin.

2. The kingpin lock as claimed in claim 1, wherein the body defines a recess having a recess surface and the sleeve channel opens into the recess and through the recess surface, such that the locking member can protrude through the recess surface when the locking member is in the disengaged position, and the locking member is substantially flush with the surface when the locking member is in the engaged position.

3. The kingpin lock as claimed in claim 1, wherein the slide member is substantially T-shaped and comprises a slide portion and a flange portion, the flange portion forming a cross bar of the T-shape and being configured to abut the body when the slide member is in the engaged position and to thereby resist an application of force directed generally toward the kingpin cavity that would otherwise drive the slide member into the kingpin cavity because of the abutment between the flange portion and the body.

4. The kingpin lock as claimed in claim 1, wherein the slide member defines a concave end portion at an end of the slide portion proximal the kingpin cavity and wherein the concave portion is offset laterally from the second central axis and the concave portion is abuttably engageable against a kingpin received in the kingpin cavity to limit removal of the kingpin lock from the kingpin.

5. The kingpin lock as claimed in claim 1, wherein the kingpin cavity has a first diameter and the frustoconical portion defines a base of a truncated cone having a second diameter, and the second diameter is greater than about two times the first diameter.

6. The kingpin lock as claimed in claim 1, wherein a ratio of the second diameter to the first diameter is greater than about two and one half to one.

7. A method of operating a kingpin lock comprising:
  substantially surrounding the kingpin with a body including a frustoconical portion, the body defining a kingpin cavity having a first central axis, a slide channel having a second central axis and a sleeve channel having a third central axis;
  positioning the slide channel to intersect the kingpin cavity such that the second central axis is substantially offset from a radius that extends outwardly from the first central axis of the kingpin cavity;
  positioning the third central axis of the sleeve channel intersecting the slide channel and such that the sleeve channel being in communication with the slide channel;
  shifting a slide member that is slidably receivable into the slide channel between an engaged position wherein a portion of the slide member extends partially into the kingpin cavity to engage a kingpin received in the kingpin cavity and a disengaged position wherein the slide member does not engage the kingpin, the slide member defining an indentation along a side thereof; and
  shifting a locking member that is slidably receivable into the sleeve channel between an engaged position and a disengaged position such that in the engaged position a portion thereof extends into the slide channel such that the locking member portion engages the indentation when the indentation is substantially aligned with the sleeve channel whereby the slide member is secured in the engaged position and the kingpin lock is secured to the kingpin.

8. The method as claimed in claim 7, further comprising selecting the body such that the body defines a recess having a recess surface and the sleeve channel opens into the recess and through the recess surface such that the locking member can protrude through the recess surface when the locking member is in the disengaged position and the locking member is substantially flush with the surface when the locking member is in the engaged position.

9. The method as claimed in claim 7, further comprising configuring the slide member to be substantially T-shaped and to comprise a slide portion and a flange portion, the flange portion forming a cross bar of the T-shape and abutting the flange portion to the body when the slide member is in the engaged position to thereby resist an application of force directed generally toward the kingpin cavity that would otherwise drive the slide member into the kingpin cavity because of the abutment between the flange portion and the body.

10. The method as claimed in claim 7, further comprising offsetting a concave end portion at an end of the slide portion proximal the kingpin cavity laterally from the second central axis and abbuttably engaging the concave portion against a kingpin received in the kingpin cavity to limit removal of the kingpin lock from the kingpin.

11. The method as claimed in claim 7, further comprising selecting the body such that the kingpin cavity has a first diameter and the frustoconical portion defines a base of a truncated cone having a second diameter and the second diameter is greater than about two times the first diameter.

12. The method as claimed in claim 7, wherein a ratio of the second diameter to the first diameter is greater than about two and one half to one.

13. A kingpin lock comprising:
 means for blocking entry of a kingpin into a fifth wheel of a semi-tractor including a frustoconical portion the means for blocking entry defining a kingpin cavity having a first central axis, a slide channel having a second central axis and a sleeve channel having a third central axis;
 the slide channel intersecting the kingpin cavity such that the second central axis is substantially offset from a radius that extends outwardly from the first central axis of the kingpin cavity;
 the third central axis of the sleeve channel intersecting the slide channel and the sleeve channel being in communication with the slide channel;
 means for slidably latching that is slidably receivable into the slide channel such that a portion of the means for slidably latching is shiftable between an engaged position extending partially into the kingpin cavity to engage a kingpin received in the kingpin cavity and a disengaged position wherein the means for slidably latching does not engage the kingpin, the means for slidably latching defining an indentation along a side thereof; and
 means for locking that is slidably receivable into the sleeve channel and shiftable between an engaged position and a disengaged position such that in the engaged position a portion thereof extends into the slide channel such that the locking member portion engages the indentation when the indentation is substantially aligned with the sleeve channel whereby the means for slidably latching is secured in the engaged position and the kingpin lock is secured to the kingpin.

14. The kingpin lock as claimed in claim 13, wherein the means for blocking entry defines a recess having a recess surface and the sleeve channel opens into the recess and through the recess surface such that the means for locking can protrude through the recess surface when the means for locking is in the disengaged position and the means for locking is substantially flush with the surface when the means for locking is in the engaged position.

15. The kingpin lock as claimed in claim 13, wherein the means for slidably latching is substantially T-shaped and comprises a slide portion and a flange portion, the flange portion forming a cross bar of the T-shape and being configured to abut the body when the means for slidably latching is in the engaged position and to thereby resist an application of force directed generally toward the kingpin cavity that would otherwise drive the means for slidably latching into the kingpin cavity because of the abutment between the flange portion and the body.

16. The kingpin lock as claimed in claim 13, wherein the means for slidably latching defines a concave end portion at an end of the means for slidably latching proximal the kingpin cavity and wherein the concave portion is offset laterally from the second central axis and the concave portion is abuttably engageable against a kingpin received in the kingpin cavity to limit removal of the kingpin lock from the kingpin.

17. The kingpin lock as claimed in claim 13, wherein the kingpin cavity has a first diameter and the frustoconical portion defines a base of a truncated cone having a second diameter and the second diameter is greater than about two times the first diameter.

18. The kingpin lock as claimed in claim 13, wherein a ratio of the second diameter to the first diameter is greater than about two and one half to one.

\* \* \* \* \*